Figures 1, 2:
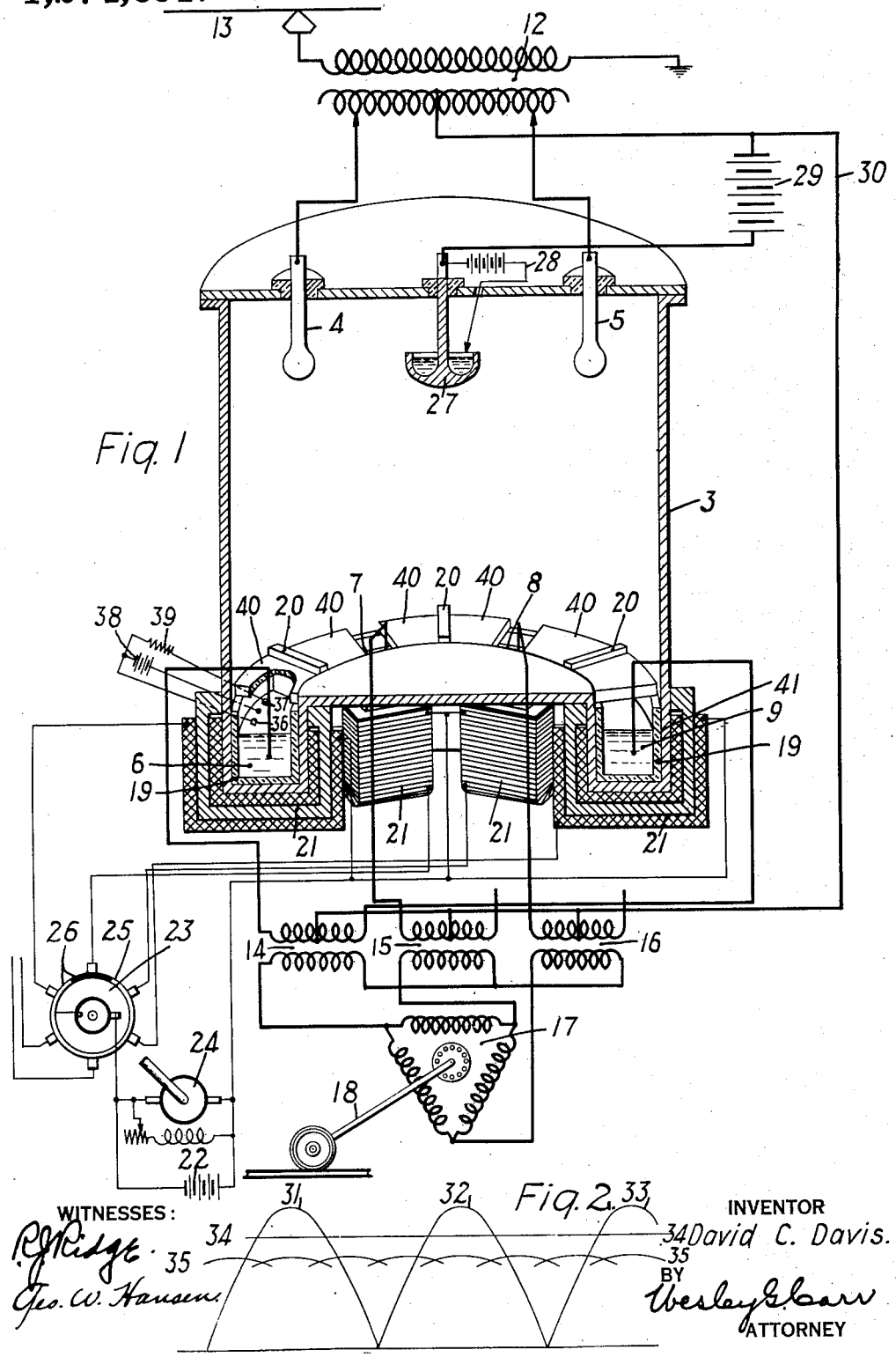

D. C. DAVIS.
CONVERTING SYSTEM.
APPLICATION FILED APR. 6, 1915.

1,274,691.

Patented Aug. 6, 1918.

WITNESSES:

INVENTOR
David C. Davis.
BY
ATTORNEY

UNITED STATES PATENT OFFICE.

DAVID C. DAVIS, OF SWISSVALE, PENNSYLVANIA, ASSIGNOR TO WESTINGHOUSE ELECTRIC AND MANUFACTURING COMPANY, A CORPORATION OF PENNSYLVANIA.

CONVERTING SYSTEM.

1,274,691.      Specification of Letters Patent.      Patented Aug. 6, 1918.

Application filed April 6, 1915. Serial No. 19,565.

*To all whom it may concern:*

Be it known that I, DAVID C. DAVIS, a citizen of the United States, and a resident of Swissvale, in the county of Allegheny and State of Pennsylvania, have invented a new and useful Improvement in Converting Systems, of which the following is a specification.

My invention relates to systems of distribution for electrical energy, and it has for its object to provide apparatus and circuits whereby single-phase current may be converted into polyphase current without the use of heavy moving parts.

In the accompanying drawing, Figure 1 is a perspective view, partially in section, of a vapor-arc device embodying a preferred form of my invention, and Fig. 2 is a wave diagram illustrating the voltage relations in the device of Fig. 1.

In the operation of systems of electrical distribution, it is frequently necessary to transfer energy from a single-phase system to a polyphase system, as, for example, in electric locomotives operating from a single-phase line and provided with polyphase motors. As the power supply of a single-phase system is intermittent, whereas the power consumption of a polyphase system is substantially uniform, it is necessary that all transferring devices of the type indicated be provided with an energy-storing device for the supply of the polyphase system when the instantaneous energy of the single-phase system is deficient. In the ordinary rotary phase splitter, the energy-storing function is performed by the inertia of the rotor. It being desirable to avoid, if possible, the use of a rotary phase splitter, on account of its large weight and size, it has been found that its place may be satisfactorily taken by a vapor-arc device for interlinking the two systems and by providing a storage battery for supplying the polyphase system during periods of deficiency in the energy-storing supply.

In an application of F. W. Meyer, Serial No. 16678, filed March 24, 1915 and assigned to the Westinghouse Electric and Manufacturing Company, there is disclosed and claimed an energy-transferring system of the character described, embodied in two distinct forms.

In the first form, a storage battery of relatively large capacity is provided and when the energy demand of the polyphase system exceeds the energy supply of the single-phase system, as occurs twice during each cycle, the deficiency of energy is supplied by said battery through suitable auxiliary anodes. This system has the disadvantage that no means are provided for renewing the charge of said battery directly from the single phase supply system.

In the second form of system disclosed in said copending application, two storage batteries are provided and the arrangement is such that, during one-half cycle in the single-phase supply, one of said batteries receives charging current while the other battery supplies the energy deficiencies. During the succeeding half cycle, the two batteries are interchanged in function.

By the present invention, I am enabled to perform all of the functions disclosed in the above-indicated application, transferring energy from a single-phase system to a polyphase system, with the use of but a single relatively small storage battery, which receives and gives up energy twice during each half cycle.

Referring to Fig. 1, a container 3, preferably of the metal type, as commonly employed for rectifiers of large capacity, is equipped with a pair of main anodes 4 and 5 and with six cathodes 6 to 11, inclusive, (10 and 11 not shown), placed in a depending annular trough 41 of non-magnetic material that is welded, or otherwise attached, to the container 3. The anodes 4 and 5 are connected, respectively, to the terminals of an adjustable transformer 12 deriving power from a single-phase line 13. The cathodes 6 to 11, inclusive, are connected, respectively, to the terminals of a plurality of transformers 14, 15 and 16 that are arranged to supply energy to a three-phase consumption circuit represented, for example, by a polyphase induction motor 17 mounted on a vehicle axle 18. Each of the cathodes 6 to 11, inclusive, comprises a pool of vaporizable reconstructing material, such as mercury, as shown at 6, contained in an insulating receptacle 19 and insulating partitions 20 separate the receptacles 19 from each other. A magnet 21 embraces each cathode and all the magnets 21 are connected to be excited from a battery 22 through a rotary switching device 23 driven by a variable speed motor 24. The switching device 23 comprises a rotating member provided with a conducting segment 25 covering substantially five-sixths of the circumference and with an insulating segment 26 covering the remainder of this circumference. Suitable brushes bear upon the periphery of the device 23 and are connected, respectively, to the magnets 21. When the device 23 is rotating, therefore, the magnets will be deënergized momentarily in rapid succession.

An auxiliary electrode 27 is mounted within the container 3 and is adapted to operate either as an anode or as a cathode, a suitable keep-alive circuit 28 being provided for use when it operates as a cathode. A storage battery 29 is connected between the electrode 27 and a wire 30 connecting neutral points in the two systems. Each of the cathodes 6 to 11, inclusive, is provided with a pair of keep-alive anodes 36 and 37, adapted to be energized from a battery 38, a resistance member 39 being included in the lead to the anode 37. The anode 36 is located over the central portion of the pool within the field of the attendant magnet 21, whereas the anode 37 is located at the end of the pool outside the influence of said field. The anode 37 is shielded from the direct action of a main arc by means of suitable cover plates 40, one of which overlies each end of each cathode pool.

In the operation of my device, a starting arc is initiated at each cathode pool in any suitable manner, and the switching device 23 is put into operation. The maintaining arc at each cathode pool will tend to operate from the central anodes 36 because of the biasing action of the resistance member 39 but, when the attendant magnet 21 is energized, the arc at the anode 36 will be blown out and one will therefore operate at the anode 37. Any tendency for a power arc to operate to a cathode of which the magnet is energized will be frustrated by the blowout action of the magnet. When a cathode, as, for example, cathode 6, is freed from the action of its magnetic field by the action of the segment 26, the keep-alive arc will at once operate from the attendant anode 36 and a main power arc, from, for example, the main anode 4, will operate thereto. By the rotation of the device 23 and the successive momentary deënergization of each of the magnets 21, the lower end of the main power arc will be caused to operate at any desired speed.

Turning now to the phenomena at the upper end of the main power arc, the voltage impulse supplied to the main anodes 4 and 5 may be represented by 31, 32 and 33 in Fig. 2. In like manner, the voltage of the battery 29 may be represented by a straight line 34—34 and that of the polyphase system by a broken line 35—35. When the voltage wave 31 is above the voltage of the battery, energy will flow from the anode 4 not only to the cathodes but also to the electrode 27, operating as a cathode, and will charge the battery 29. When the wave 31 becomes less in value than the voltage of the battery 29, as represented by the straight line 34—34, the electrode 27 will reverse in operation and become an anode, supplying energy to the main power arc from the battery 29 until the succeeding supply wave 32, operating from the anode 5, is of sufficient voltage to take up the supply of power to the main arc, in addition causing another reversal in function of the electrode 27 and another momentary charging of the battery 29. It will thus be seen that the battery 29 gives and takes a charge with each half cycle of the supply energy and that the electrode 27 operates alternately as an anode and as a cathode at a rate corresponding to twice the frequency of the supply energy. The height of the line 34—34, representing the voltage 29, will automatically adjust itself to the proper intermediate value between the wave crests of the single-phase and polyphase systems. If the voltage of the battery rises too high, the battery will be forced to supply more energy to the consumption circuit and the charge will be dissipated, whereas, if the voltage of the battery falls too low, the charging period will be automatically increased and the discharging period will be automatically decreased.

By the control of the speed of the motor 24, the frequency of the alternating-current supply to the motor 17 may readily be controlled and, as the motor 17 tends to operate near synchronism, a remarkably simple and effective control of the speed of the vehicle may be obtained.

While I have shown and described my invention in the preferred embodiment thereof, it will be obvious to those skilled in the art that it is susceptible of various minor changes and modifications without departing from the spirit thereof and I desire, therefore, that no restrictions shall be placed thereupon except such as are imposed by the prior art or are specifically set forth in the appended claims.

I claim as my invention:

1. In vapor electric apparatus, the combination with main anodes and cathodes connected to an alternating current source and to an alternating current load, of an auxiliary electrode of bilateral conductivity so connected to energy-storing means as to absorb energy from the vapor arc when the instantaneous voltage of said source is high and to restore said energy to the vapor arc when the instantaneous voltage of said source is low.

2. The combination with a source of single-phase alternating current, of a pair of electrodes of one polarity connected to the terminals thereof, a group of electrodes of the other polarity mounted adjacent thereto, a plurality of transformers, connections from said last-named electrodes to terminals of the primary windings of said transformers, a polyphase system of distribution connected to the secondary windings of said transformers, a connection from the mid point of said source to the mid points of said primary windings, an additional electrode adjacent to said aforementioned electrodes and adapted to operate as an anode or as a cathode, a battery floating between said additional electrode and said mid-point connection, whereby an arc may be established and maintained between said pair and said groups of electrodes, and means for causing said arc to operate in succession upon each of the electrodes in said group.

3. The combination with a source of single-phase alternating current, of an evacuated container, a pair of anodes therein and connected to terminals of said source, a plurality of cathodes in said container, a polyphase distributing system, a plurality of transformers having their primary windings connected to said cathodes and having their secondary windings connected to said polyphase distributing system, a connection between substantially the mid point of said primary windings to substantially the mid point of said source, an auxiliary electrode within said container and adapted to operate either as an anode or as a cathode, a battery connected between said auxiliary electrode and said mid-point connection, and magnetic means to urge an arc between said anodes and said cathodes to impinge upon each of said cathodes in succession.

In testimony whereof, I have hereunto subscribed my name this 27th day of March 1915.

DAVID C. DAVIS.